Nov. 2, 1965 J. TERZIAN 3,215,987

ELECTRONIC DATA PROCESSING

Filed June 4, 1962 4 Sheets-Sheet 1

INVENTOR.
JOHN TERZIAN

BY [signature]

ATTORNEY

INVENTOR.
JOHN TERZIAN
BY F. J. Sullivan
ATTORNEY

INVENTOR.
JOHN TERZIAN
BY F. J. Sullivan
ATTORNEY

INVENTOR.
JOHN TERZIAN

BY F. I. Sullivan
ATTORNEY 3,215,987
ELECTRONIC DATA PROCESSING
John Terzian, Winchester, Mass., assignor to Sylvania Electric Products Inc., a corporation of Delaware
Filed June 4, 1962, Ser. No. 199,818
13 Claims. (Cl. 340—172.5)

This invention is concerned with data processing equipment and particularly with an improved system organization for electronic computers.

A major problem in the design of data processing equipment is the selection of suitable means for controlling the logical control sequences (also called microoperations) which are necessary for carrying out a program instruction (also called a macroinstruction). The ultimate choice depends upon a weighing of such factors as programming flexibility and complexity, speed, design complication, size, cost, etc.

The most conventional method of control utilizes a control unit comprised of built-in logic circuits to effect this purpose. A set of equations is generated for each program instruction to determine the individual microoperations required to implement it, and these are then converted to diagrams specifying the logic to be wired into the machine and selectively set into operation by its control unit. Thus, each program operation has a fixed sequence of microoperations which must be adhered to by the programmer because they are wired into the machine. Consequently, favorable speed, size, and cost is achieved in the computing machine at the expense of programming flexibility.

A different approach to the problem is followed by the microprogrammed computer. In this type of machine, the operation called for by a single macroinstruction can be broken down into a sequence of more elementary operations, referred to as microinstructions. Thus, a microprogram is a sequence of microinstructions, and execution of this sequence of instructions in response to an input program has the same effect as automatic execution of the more conventional macroinstruction.

The principal advantage of the microprogrammed computer is a greatly increased flexibilty available to the programmer. Direct access to machine elementary operations allows him the opportunity to tailor the operation of the machine to the specific problem to be solved. This, in effect, gives a general purpose computer the characteristics of a special purpose computer with its associated advantages such as economy in time of solution. Despite these advantages, however, the microprogrammed computer has not come into general usage because of the complex programming techniques which it requires. Most computers which are now available for microprogramming utilize a central memory with a decoder for storing and interpreting operating programs that are prepared at the microprogram level by using control words as instructions. It is therefore difficult to change microinstructions for different applications because of the permanent wiring of the decoder. Consequently, there is repeated occurrence of superfluous operations and partial back-tracking to compensate for their unwanted results. In addition to placing this burden on the programmer, the net speed of operation is reduced and the amount of internal logic is increased.

Accordingly, a primary object of the present invention is to provide, for data processing equipment, a control system which affords the programmer complete flexibility with a minimum of programming requirements. Another object is to reduce logic design complexity in electronic data processing machines. Still further objects are to provide an improved microprogrammed computer with an increase in speed and a decrease in cost and size in comparison with equipment hitherto available. A still further object is to provide an improved system organization for electronic data processing equipments.

These and related objects are accomplished in one embodiment of the invention by a microprogrammed computer system which features an arrangement wherein all main components including a program memory unit, a control unit, an arithmetic unit, input-output registers, internal registers, an arithmetic logic unit, etc. are connected between two main transfer buses. The arithmetic logic unit is arranged in stages such that each contains individual groups of logic circuits, one for accomplishing each of the following functions: add, increment, decrement, transfer, complement, shift right one place, and shift left one place. Thus, when data contained in any register is to be logically operated upon, it is transferred, via one transfer bus, to this specialized unit where the logic is performed and then it is transferred back to its register via the other bus. Such an arrangement of central logic units eliminates the conventional repetition of logic circuits for program counters, index registers, etc. throughout the system and accordingly reduces size, cost, and logic design.

The control system includes an addressable memory which stores the various microinstructions needed to carry out program instructions. Such a memory is capable of recycling through certain microinstructions or completely skipping over undesired ones, depending upon the macroinstruction being carried out and the most effective (e.g. fastest) method of effecting it. The contents of this memory is transferred, an instruction at a time, to a decoder where it controls the data flow to and from the various arithmetic, etc. units of the machine. The contents of the control memory may readily be changed by simply reading-in new information without need for rewiring. The programmer is thus given more flexibility and the need for back-tracking is eliminated.

Other objects and features of the invention will be apparent from the following description and reference to the accompanying drawings, wherein:

FIG. 1 is a block diagram of a computer system embodying the invention;

FIGS. *2a–d* are diagrammatic representations of the data words processed in the computer of FIG. 1;

Figure 1:
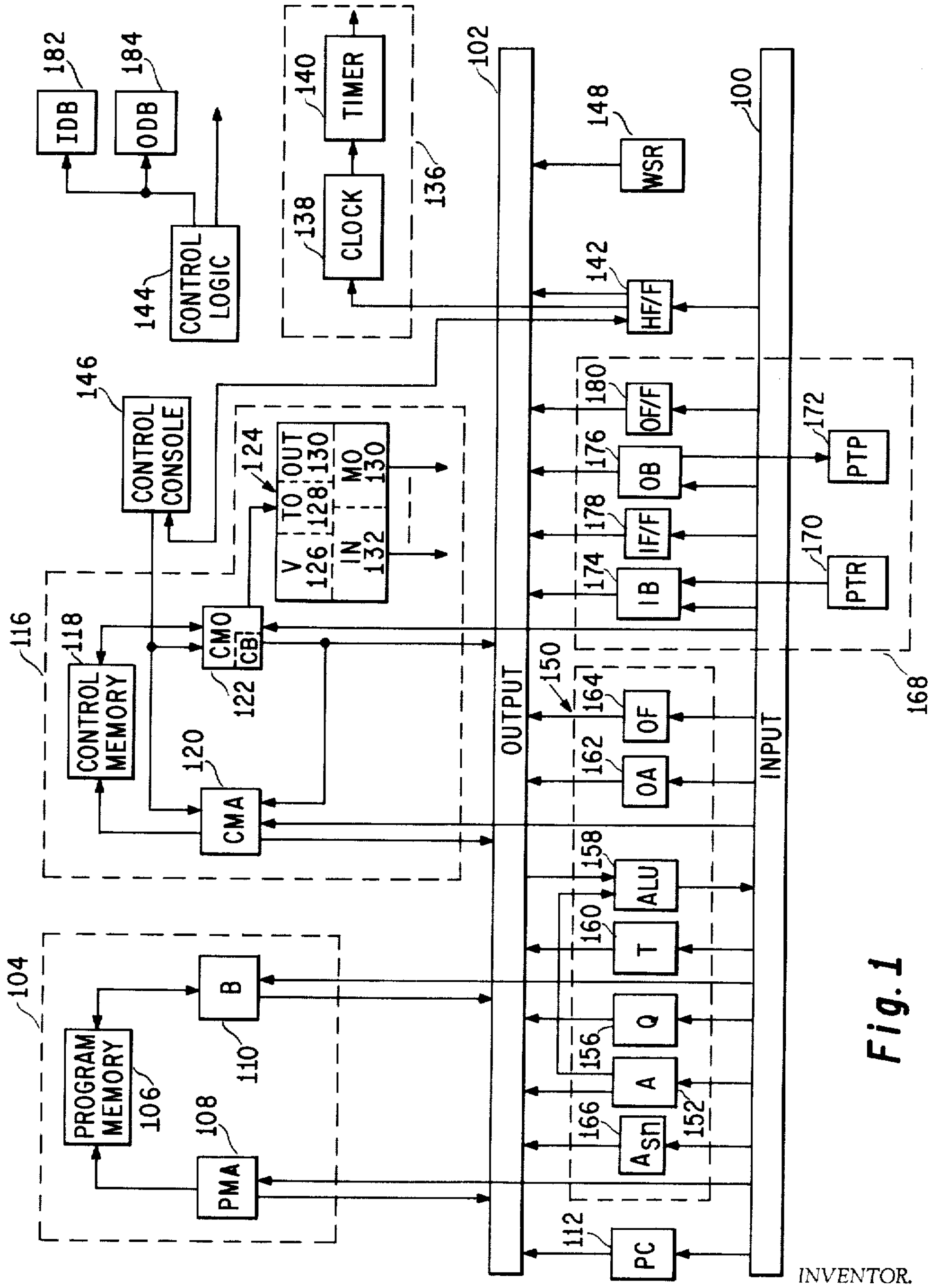

The computer shown in FIG. 1 is a high speed digital system designed for parallel processing of data in the form of a binary word such as the thirty bit examples of FIGS. *2a–d*. The main components of this computer are connected between an Input Transfer Bus 100 and an Output Transfer Bus 102, each of which comprises a separate conductor for each one of the thirty information bits of the data word. The principal components so connected include: a Program Memory Unit 104 having a Program Memory Address Register 108 and a Program Memory In-Out Register 110 each connected between buses 100 and 102, and a Program Memory 106 connected to these registers; a Program Counter 112; a Control Memory Unit 116 having a Control Memory Address Register 120 connected between buses, a Control Memory Input-Output Register 122 connected between buses, a Control Memory 118 connected to both these registers, and the Control Memory Output Register Decoders 124 whose input is connected from register 122 and whose outputs are connected to various units throughout the machine; an Arithmetic Unit 150 comprising an A Register 152, a Q Register 156, an Arithmetic Logic Unit 158, and a T Register 160; a Word Switch Register 148; and, an Input-Output System 168 having an Input Buffer Register 174 and an Output Buffer Register 176 each connected between the buses, a Paper Tape Reader 170 feeding register 174, and a Paper Tape Punch 172 connected to register 176. Timing for the system is generated by Timing Unit 136 comprising Clock 138 and Timer 140. Control Logic Unit 144 affords auxiliary control for the system and a Control Console 146 allows for manual control of microroutines via registers 120 and 122.

GENERAL DESCRIPTION

The operation of the computing mechanism under description is primarily concerned with the following functions:

(1) Transferring to the Program Memory 106 macroinstructions during the Program Read-in Microroutine and data during the Input Processing Microroutine.

(2) Stepping through the Basic Cycle Microroutine by calling a macroinstruction at a time from Program Memory 106 and addressing the resulting microinstructions of the appropriate instruction as they are processed from Control Memory 118.

(3) Executing the macroinstructions by cycling through the indicated instruction microroutines by extracting the operands from Program Memory 106, transferring them over Output Transfer Bus 102 to the Arithmetic Logic Unit 158 where they are logically operated upon, and then conveying them over the Input Transfer Bus 100 to the appropriate subdivision of the Arithmetic Unit 150, all under the control of the microinstructions contained in Decoder 124.

MORE DETAILED DESCRIPTION OF COMPONENTS AND BASIC OPERATIONS

*Main transfer buses*

The input Transfer Bus 100 and the Output Transfer Bus 102 are each comprised of thirty conductors, one corresponding to each digit of the various WORD FORMATS of FIGS. 2*a–d*. Each single conductor comprises a separate coaxial cable to prevent the occurrence of undesirable ringing and cross-talk. As will be described in more detail later, the two bus system shown in FIG. 1 facilitates flexibility and economy because it is so arranged as to enable a single group of logic circuits to perform whatever logic or arithmetic functions are desired on data as it is transferred from any one major location, register, etc. of the machine to any other.

*Program memory unit*

PROGRAM MEMORY

The Program Memory 106 may comprise a conventional randon-access, ferrite core, coincident-current memory. Copending United States patent applications Serial Nos. 679,967 of August 23, 1957 (now Pat. No. 3,058,096) and 727,602 of Apr. 10, 1958, may be consulted for a detailed description of the construction and operation of a suitable memory of this type. The manner in which data and program information is loaded into this memory will be described more fully below under the headings Input Processing Microroutine and Program Read-In Microroutine.

AUXILIARY PROGRAM MEMORY REGISTERS

When a READ level is applied to Program Memory 106, the contents of the memory location specified by the Program Memory Address Register 108 are extracted from memory and transferred to the Program Memory In-Out Register 110 which acts as a buffer for data being written into or read out of the Program Memory 106. Conversely, when a WRITE level is applied, the contents of the Program Memory In-Out Register 110 are transferred to storage in the memory location specified by the Program Memory Address Register 108. Both of these auxiliary registers may be conventional flip-flop multibit storage devices with associated input and output gates. Their operation and coaction is fully explained in co-pending United States patent application Ser. No. 755,565 of Aug. 18, 1958, now Pat. No. 3,061,192.

The Program Memory Address Register 108 has, as described in the above-referenced patent applications, the ability to specify the address of any one of the internal addresses of the Program Memory Unit 106 by proper setting of its component flip-flop stages. In the illustrative system under present description it may comprise a fifteen-bit storage register connected to the memory address decoders which are part of the internal memory electronics, and also, in data transfer relationship, to channels 1 through 15, respectively, of the Input Transfer Bus 100 and the Output Transfer Bus 102. Inputs to this register are derived from the Control Memory Output Register 122 or from Program Counter 112. Its control connections to the Control Memory 116 and Control Logic Unit 144 include: TRANSFER IN FROM BUS; and, TRANSFER OUT TO BUS.

Figure 2:
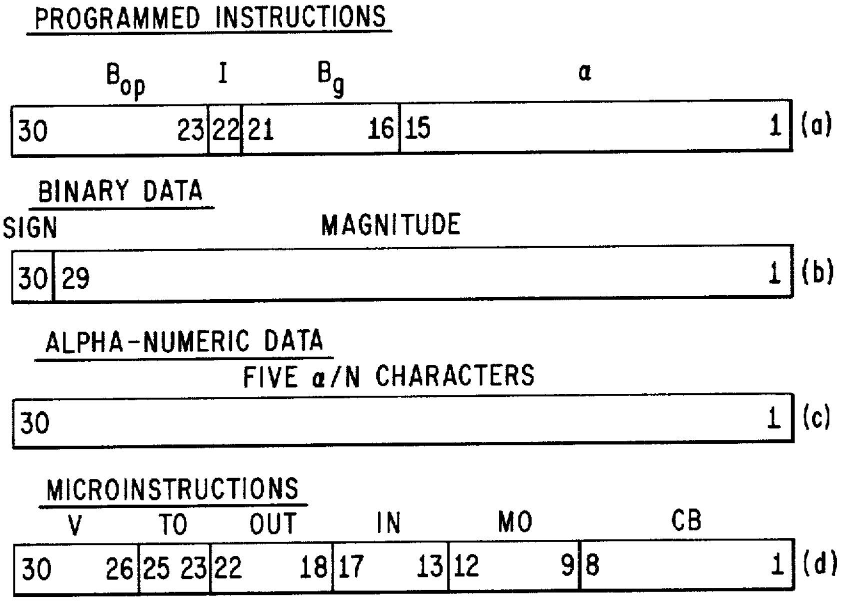

In the system under description, and working with the data word of FIGS. 2*a–d*, the Program Memory In-Out Register or B Register 110 may be a thirty-bit buffer storage register connected in data transfer relationship to the sense amplifier outputs of Program Memory 106, as well as between the Input Transfer Bus 100 and the Output Transfer Bus 102. It is possible to transfer out the full contents of this register or individual fields as though they were separate registers. (These fields will be further described below under the heading WORD FORMATS.) Two such fields can be addressed in this manner. The first is the operation code field, which is referred to as $B_{op}$ (FIG. 2*a*). Whenever $B_{op}$ is addressed as an output location by a microinstruction in Control Memory Output Decoder 124, the contents of stages 23 through 30 of the Program Memory In-Out Register 110 are transferred to channels 1 through 8 of the Output Transfer Bus 102. The second special field is the index field referred to as $B_g$ (FIG. 2*b*). Whenever $B_g$ is addressed as an output location by a microinstruction, stages 16 through 21 transfer their information to channels 1 through 6 of the Output Transfer Bus 102. The control connections to Register 110 from Control Memory 116 and Control Logic Unit 144 include: TRANSFER IN FROM SENSE AMPLIFIERS; TRANSFER IN FROM BUS; TRANSFER OUT TO BUS; TRANSFER OUT $B_{op}$; and, TRANSFER OUT $B_g$.

*Program counter*

The Program Counter 112 is a fifteen stage register arranged as a counter comprised of conventional flip-flop devices with associated input and output gates. It holds the address of each subsequent program instruction until its transfer to the Program Memory Address Register 108. The connections from the Control Logic Unit 144 include: TRANSFER IN FROM BUS; and TRANSFER OUT TO BUS.

*Control memory unit*

CONTROL MEMORY

The Control Memory 118 may be of the same type and operation as the Program Memory 106. It is used to store the microinstructions which must be performed in executing the macroinstructions. However, it is not limited to this type of memory and any type of core memory could be used. Also, instead of cores it may be comprised of multi-aperture magnetic devices, nonlinear resistors, diode matrices, etc. In the system under description, it has a word length of thirty bits with a capacity of 256 words.

The Control Memory Address Register 120 is an eight bit flip-flop register with associated input and output gates connected to channels 1 through 8 of both the Input Transfer Bus 100 and the Output Transfer Bus 102. It is used for specifying the desired address in Control Memory 118, so that its outputs are also connected directly to the internal memory decoders. The input information to this register comes from either the Control Console 146, the Control Memory Input-Output Register 122, or the Program Memory In-Out Register 110. Appropriate logic circuits are also connected directly to it to enable this register to operate as a conventional binary counter. Its transfer levels coming from the Control Register Decoders 124 and Control Logis Unit 144 include: TRANSFER IN FROM BUS; and, TRANSFER OUT TO BUS.

The Control Memory Input-Output Register 122 is a thirty bit flip-flop device with associated input and output gates connected to channels 1 through 30 of both the Input Transfer Bus 100 and the Output Transfer Bus 102. Information may be read from or entered into memory through this register.

Whenever a READ level is applied to Control Memory 118, the contents of the address specified by Control Memory Address Register 120 is loaded into this register. A subsequent WRITE level then causes this information to be rewritten back into memory so that it will not be lost. Also, the contents of this register 122 is transferred to the Control Memory Output Register Decoders 124 which then generate the control levels indicated by it. In addition, stages 1 through 8 may be addressed as a special control field referred to as CB (FIG. 2*d*). When this is done, bits 1 through 8 are transmitted to channels 1 through 8 of the Output Transfer Bus 102.

This register 122 may also be used in cooperation with the INPUT-OUTPUT SYSTEM to transfer new microinstructions into Control Memory 118. Such operation is fully explained below under the heading Control Write-in Cycle. Briefly, each microinstruction is read from paper tape and assembled in A Register 152. From there it is transferred to Control Memory Input-Output Register 122 and control levels from Control Logic Unit 144 cause it to be written into memory.

The transfer levels to this register coming from the Control Logic Unit 144 and the Control Register Decoders 124 include: TRANSFER IN FROM SENSE AMPLIFIERS; TRANSFER IN FROM BUS; and, TRANSFER OUT TO BUS.

CONTROL MEMORY INPUT-OUTPUT REGISTER DECODERS

The microinstructions which appear in the Control Memory Input-Output Register 122 are subdivided into six separate fields as shown in FIG. 2*d*. One of these fields, CB, is simply treated as an eight bit register which can be gated to the Output Transfer Bus 102 or transferred directly to Control Memory Address Register 120. The remaining five fields must be decoded individually to select one of up to $2^n$ lines per field, where $n$ is the number of bits in the field being decoded. Accordingly, a separate decoder comprising a conventional logic matrix is provided for each of these five fields. They are the V Decoder 126, the TO Decoder 128, the OUT Decoder 130, the IN Decoder 132, and the MO Decoder 134. The outputs from these decoders are synchronized by the timing levels derived from the Timing Unit 136. The individual microprograms utilizing these various decoders will be further described below under the heading MICROPROGRAMS.

*Timing unit*

CLOCK

The Clock 138 of Timing Unit 136 may be a crystal controlled multivibrator providing a 500 kc. square wave pulse train.

TIMER

Figure 3:
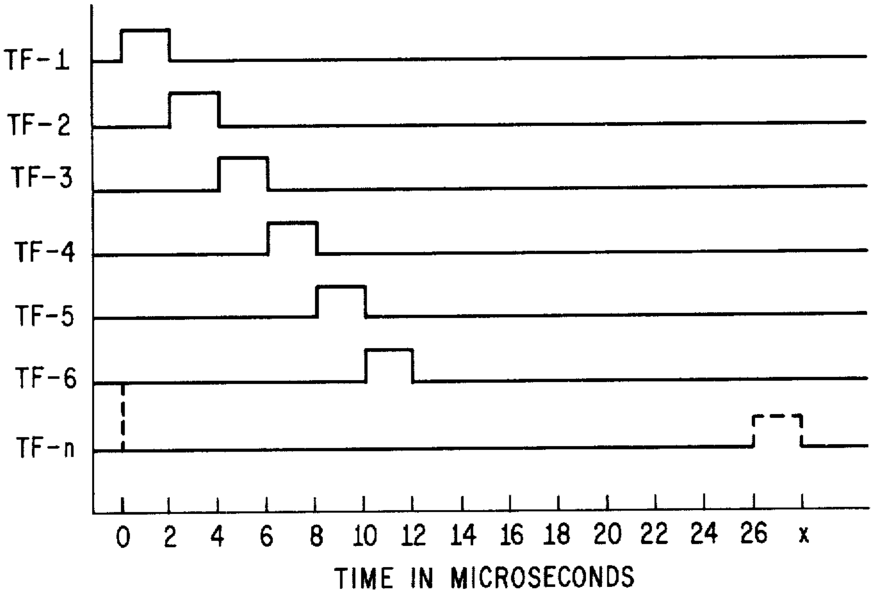
FIG. 3 is a diagram of the timing levels of the computer of FIG. 1.

The Timer 140 is comprised of a logic matrix which receives the pulse train from Clock 138 and, for the timing scheme shown, emits individual 2 microsecond levels at times corresponding to the pulses of the train, as shown in FIG. 3. The number of these pulses which will comprise a basic cycle is determined, through appropriate decoding of the instruction, by the length of the microroutine being processed.

HALT FLIP-FLOP

The Halt Flip-Flop 142 is used to control the emission of timing levels to the computer. Whenever it is in the ZERO state, they are allowed to be distributed throughout the machine in the normal manner. If, however, it is set to a ONE, they are interrupted and the computer is halted. Such a resetting may be done automatically or manually via the Control Console 146. A set condition of Halt Flip-Flop 142 allows the Control Console 146 to execute its operations manually. The control connections for Halt Flip-Flop 142 from Control Memory 118 include: CLEAR; and, SET.

*Control logic unit*

The Control Logic Unit 144 is comprised of a conventional logic control matrix and is used to generate the few control levels which are needed in addition to the microprogram controls. The outputs from this matrix are synchronized by the system clock and timing levels. All of the control levels which are necessary to load new information into the Control Memory Input-Output Register 122 are generated by this unit. Such operation will be explained below under the heading Control Write-in Cycle.

*Control console*

The Control Console 146 is comprised of push-button and toggle switches. It has separate individual push-button switches to perform the following functions: set the Halt Flip-Flop 142; clear the Halt Flip-Flop 142; load the lead address of the Clear Computer microroutine into the Control Memory Address Register 120; load the lead address of the Clear Memory microroutine into the Control Memory Address Register 120; load the lead address of the Program Read-in microroutine into the Control Memory Address Register 120; initiate the Control Write-in Cycle; and, gate the microinstruction which is set up on one of the toggle switch registers into Control Memory Output Register 122. The microroutines mentioned above will be explained under the heading MICROROUTINES. Individual toggle switch registers may hold the following information: microinstructions; Clear Computer microroutine address; Clear Memory microroutine address; and Program Read-in microroutine address.

*Word switch register*

The Word Switch Register 148 comprises thirty toggle switches for manually entering data into the computer. There are no connections from the Input Transfer Bus 100 to this register but there are connections to the Output Transfer Bus 102. The control connection from Control Memory Unit 116 is: TRANSFER OUT TO BUS.

*Arithmetic unit*

The Arithmetic Unit 150 is that section of the computer where the actual arithmetic and logical operations of the program are implemented.

A REGISTER

The A Register 152, or Accumulator, may be considered the main register of the Arithmetic Unit 150. Most of the arithmetic or logical operations performed by the computer involve either the existing contents of this register or quantities which are processed through it before they are operated upon. In the four basic arithmetic operations, Add, Subtract, Multiply, and Divide, the A Register 152 holds, respectively, the sum, difference, product, and remainder resulting from the specific operation. At the beginning of the operations, Add or Subtract, it holds the augend or minuend, respectively.

This register 152 is basically a thirty stage register of the accumulator type and is comprised of flip-flops with associated input and output gates. For certain arithmetical operations, it is sometimes desirable to treat the contents of the Overflow Flip-Flop 164 as the most significant bit of the A Register 152. When this configuration is desired, the contents of the Overflow Flip-Flop 164 is gated out to channel 30 of the Output Transfer Bus 102 by a TRANSFER-OUT level from Control Memory 116 and the contents of A Register stages $A_1$–$A_{29}$ are connected to channels 1 through 29. It should be noted here that flip-flop 30 or $A_{sn}$ Flip-Flop 16 contains the sign of the data in flip-flops 1 through 29, and is not a data bit. The control connections to the A Register 152 from Control Memory 116 include: TRANSFER IN FROM BUS; and TRANSFER OUT TO BUS.

B REGISTER

What in a conventional system would be the B Register of Arithmetic Unit 150 is actually the Program Memory In-Out Register 110. This double duty of a single register is possible since two operations are not going on at the same time as, for example, in the machine of co-pending United States patent application Ser. No. 755,565, supra. Furthermore, to perform subtraction, the complementing of the contents of this register is done in the Arithmetic Logic Unit 158 so that no additional logic circuits for register 110 are necessary. In the four basic arithmetic processes, this register holds respectively the addend, subtrahend, multiplicand, and divisor.

Q REGISTER

The Q Register 156, also known as the Multiplier-Quotient Register, is an auxiliary device of the Arithmetic Unit 150. It is a thirty stage register comprised of flip-flops with associated input and output gates, and finds primary use in the multiplication and division operations. During these processes it holds the multiplier, low order bits of a double-length product or dividend, and the quotient. It can also be used for general or temporary storage of information, and may be joined with the A Register 152 for double-length shift operations. Its control connections from Control Memory 116 include: TRANSFER IN FROM BUS; and TRANSFER OUT TO BUS.

ARITHMETIC LOGIC UNIT

The Arithmetic Logic Unit 158 is a special feature of this invention. For processing the thirty bit word of the system under description, it contains thirty different circuits, one for each bit, which are operated differently to perform different functions such as carry, complement, shift right one place, shift left one place, add magnitude, increment, decrement, and transfer which are required to implement the arithmetic and logic operations that occur in the three principal registers (A,B, and Q) of the Arithmetic Unit 150. Each group is connected to a different bus channel. A more complete description of the individual logic circuits will be described below with reference to FIG. 5.

T REGISTER

The T Register 160 is an eight bit counting register comprised of flip-flops with associated input and output gates, which is principally used as a control counter during arithmetic operations. Its control connections from Control Memory 116 include: TRANSFER IN FROM BUS; and, TRANSFER OUT TO BUS.

*Associated flip-flops*

OVERFLOW ALARM FLIP-FLOP

The Overflow Alarm Flip-Flop 162 is set when an input gate is enabled by the presence of a level from Control Memory 116 together with a pulse indicating that overflow has occurred during addition. Its control signals from Control Memory 116 include: TRANSFER IN FROM BUS; and, TRANSFER OUT TO BUS.

$A_{sn}$ FLIP-FLOP

The $A_{sn}$ Flip-Flop 166 is the 30th stage of A Register 152 and designates the sign of the stored binary number. It is included as part of A Register 152 whenever A is specified by a microinstruction, but may be addressed individually whenever the address $A_{sn}$ is specified by a microinstruction. Its control connections from Control Memory 116 include: TRANSFER IN FROM BUS; and, TRANSFER OUT TO BUS.

*Basic arithmetic modes*

ADD is executed by adding to the contents of one register (A) the contents of another register (B), and is accomplished in a conventional parallel operation using the ADD logic of the Arithmetic Logic Unit 158.

SUBTRACT is executed conventionally by complementing the contents of the B Register 110 and adding the result to the A Register 152, using Arithmetic Logic Unit 158.

MULTIPLY is effected in a conventional manner by shifting the multiplicand (contained in the B Register 110) the number of times indicated by the multiplier (carried in the Q Register 156) and adding the result after each shift to the contents of the A Register 152 until this register contains the final product. During multiplication the most significant stage of the Q Register 156 is joined to the least significant stage of the A Register 152 to handle the low order bits of a double-length product. Thus, the multiplier bits are shifted out of the low end of the Q Register 156 as their respective operations are performed, and the capacity vacated is taken by a portion of the product. Although this procedure of multiplication is conventional, the actual shifting and adding is accomplished in the Arithmetic Logic Unit 158 in a manner which is unique with this invention and will be explained in more detail later.

DIVIDE is performed according to basic principles as outlined in R. K. Richards, Arithmetic Operations in Digital Computers, D. Van Nostrand Co., 1955, pp. 166–172, and using the "non-restoring" technique described by J. H. Felker in an article entitled "Arithmetic Processes for Digital Computers" in Electronics, vol. 26, No. 3, pp. 150–155, March 1953. Initially, the most significant digits of the dividend are located in the A Register 152 and act as a remainder. The divisor (contained in the B Register 110) is shift to the left by means of Arithmetic Logic Unit 158 in order to coincide with these digits and is then subtracted from them. Successive subtractions are made until the proper quotient digit is found. The new remainder is always put into the A Register 152 so that the divisor may be subtracted from it. The Q Register 156 holds the quotient, and the low order bits of the dividend until they are required to be added on as low order bits of the remainder. This is necessary when the number of bits in the divisor exceeds the number in the remainder and corresponds to "bringing-down" in manual division.

*Input-output system*

The Input-Output system 168 comprises an input device, e.g. the Paper Tape Reader 170, an output device, e.g. the Paper Tape Punch 172, and their associated registers and flip-flops.

The Input Buffer 174 is a six bit register comprised of flip-flops with associated input and output gates, and is used to store data received from the Paper Tape Reader 170. In addition to being connected to the Input Transfer Bus 100 and the Output Transfer Bus 102, this register has its inputs connected directly to the Paper Tape Reader 170. The control signals from Control Memory 116 include: TRANSFER IN FROM BUS; and, TRANSFER OUT TO BUS. The control connections from the Control Logic Unit 144 include: TRANSFER IN FROM PAPER TAPE READER; and, TRANSFER OUT TO BUS.

The Output Buffer 176 is a six bit register comprised of flip-flops with associated input and output gates, and is used to store data which is to be punched out on paper tape by the Paper Tape Punch 172. In addition to being connected to the Input Transfer Bus 100 and the Output Transfer Bus 102, this register also has its outputs connected directly to the Paper Tape Punch 172. The control signals from Control Memory 116 include: TRANSFER IN FROM BUS; and, TRANSFER OUT TO BUS. The control connections from the Control Logic Unit 144 include: TRANSFER OUT TO PAPER TAPE PUNCH.

The Input Device Flip-Flop 178 is used to control the Paper Tape Reader 170. Whenever it is in the ZERO state, the Reader is inoperative. If, however, this flip-flop is set to a ONE, the Reader is turned on and commences to read paper tape. The control connections from Control Memory 116 include: CLEAR; and SET.

The Output Device Flip-Flop 180 controls the Paper Tape Punch 172 in a manner analogous to the way in which the Input Device Flip-Flop 178 controls the Paper Tape Reader 170. When it is in the ZERO state, the Punch 172 will be inactive. If, however, it is set to a ONE, the Punch is turned on and will commence punching paper tape in accordance with the contents of the Output Buffer Register 176. The control connections of this flip-flop from Control Memory 116 include: CLEAR; and, SET.

The Input Device Busy Flip-Flop 182 is used to inform the computer that a character has been transmitted from the Paper Tape Reader 170 to the Input Buffer Register 174 and is set to a ONE automatically whenever such a transfer occurs. Its control connections from the Control Logic Unitd 144 include: CLEAR.

The Output Device Busy Flip-Flop 184 informs the computer that a character has been transferred out to the Paper Tape Punch 172 when is set to a ONE. Its control connections from the Control Memory 116 include: CLEAR.

The manner in which the INPUT-OUTPUT SYSTEM functions to transfer data and instruction words into and out of the Program Memory 106 will be explained under the headings Input-Output Cycle, Input Processing Microroutine, and Output Processing Microroutine. The transfer of microinstructions through this system to Control Memory 118 will be described under the heading Control Write-in Cycle.

*Word formats*

PROGRAMMED INSTRUCTIONS

The word format used for the Programmed or macroinstructions stored in Program Memory 106 is shown in FIG. 2*a*. This instruction is divided into the alpha field ($\alpha$), the $B_g$ field, the I field; and the $B_{op}$ field.

The alpha field comprises bits one through fifteen and specifies the address in Program Memory 106 where the data to be used in the performance of an instruction is located. In addition, this field may be used to specify the number of shifts for shift instructions or to specify "next instruction" addresses for control transfer operations.

The $B_g$ field comprises bits sixteen through twenty-one and specifies one of sixty-four possible index information loctaions in Program Memory 106 so that index registers are unnecessary, as will be explained below.

The I field is comprised of bit twenty-two which is used to specify whether an absolute or relative, i.e. indexed, address is to be used with an instruction. For example, a ZERO indicates an absolute address whereas a ONE indicates a relative address.

The $B_{op}$ field comprises bits twenty-three to thirty and designates the operation to be performed by the computer upon the address specified by the alpha field, $B_g$ field, etc. Binary Data:

The numerical data format shown in FIG. 2*b* is in binary notation using the magnitude and sign convention. Bits one through twenty-nine represent the magnitude of a number whereas bit thirty represents the sign. A ZERO sign bit indicates a plus while a ONE indicates a minus. A fixed binary point is assumed to be located between bits twenty-nine and thirty.

ALPHA-NUMERIC DATA

FIG. 2*c* shows that the format for Alpha-Numeric Data is similar to that for binary data with the sign bit eliminated. A specialized code is employed wherein any alpha-numeric quantity may be expressed by an individual combination of six binary bits, thus enabling five characters to be stored for each computer word. Although this computer functions as a binary machine, it is possible to perform logical operations, such as comparison, directly on Alpha-Numeric Data in this word format without conversion to a binary value.

MICROINSTRUCTIONS

The word format used for the microinstructions stored in the Control Memory 118 is shown in FIG. 2*d*. This instruction is divided into the V field, the TO field, the OUT field, the IN field, the MO field, and the CB field.

The V or variable field specifies one of the thirty-two possible binary words which must be satisfied for a microoperation to be executed and is specified by the condition of bits twenty-six through thirty.

The TO or tage operation field specifies one of the eight possible special operations which are to be executed in addition to the main operation specified by the microinstruction and is represented by bits twenty-three through twenty-five.

The OUT field is designated by bits eighteen through twenty-two and specifies which one of thirty-two possible registers is to transfer data out to the Output Transfer Bus 102.

The IN field specifies which one of the thirty-two possible registers is to receive data from the Input Transfer Bus 100. It is represented by bits thirteen through seventeen.

The MO field includes bits nine through twelve and designates one of sixteen microoperations to be performed.

The CB or control bit field consists of bits one through eight and is used for various control purposes. Its primary use is as a control transfer address of microinstructions but it may also be used for specifying special addresses in Program Memory 106 or as a constant to be loaded into machine registers.

*Data transfer*

Figure 4:
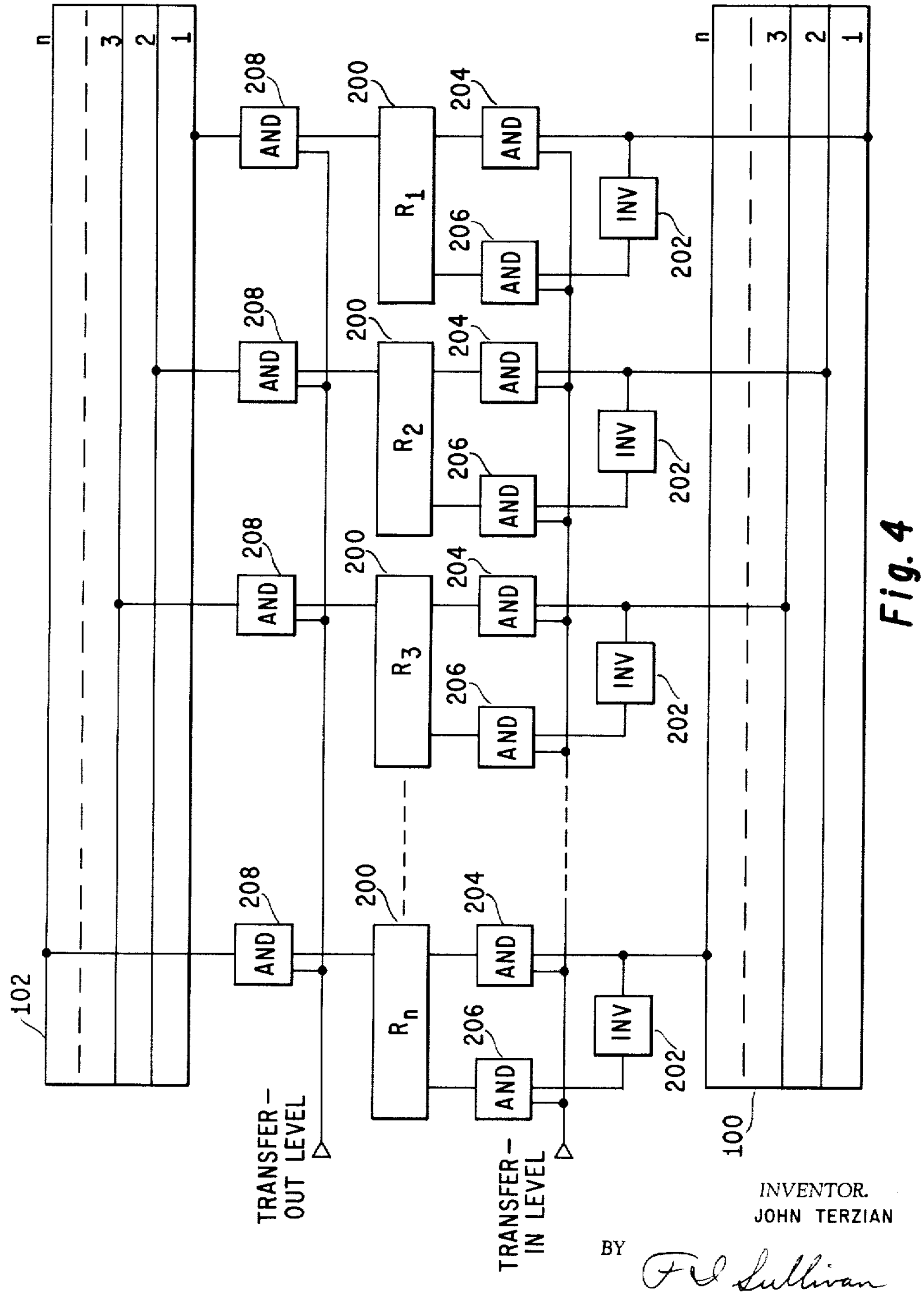
FIG. 4 is a diagrammatic representation of a representative portion of the pulse transfer mechanism of the comparator; and, FIG. 5 is a diagrammatic representation of one stage of the arithmetic logic unit.

The means for transferring data from the Input Transfer Bus 100 to a register and from the register to the Output Transfer Bus 102 are depicted in FIG. 4. Register stages $R_1$–$R_n$ are comprised of flip-flops 200 of the set-reset type. They are connected to corresponding conductors 1–*n* of buses 100 and 102 by AND gates 204, 206, 208 and INVERTERS 202.

Each bit of a word which is present on Input Transfer Bus 100 appears at the input to its corresponding AND gate 204 in all registers. In addition, each bit is inverted by gate 202 and transmitted to AND gate 206. However, this information does not pass through either gate 204 or 206 until the register is selected by Control Memory 116 and receives a TRANSFER-IN FROM BUS signal level. When this happens, if a ONE is present on the bus, AND gate 204 will be enabled and thus set flip-flop 200 to the ONE state. A ZERO on the bus, however, is inverted by INVERTER 202 so that AND gate 206 is enabled and flip-flop 200 is reset to the ZERO state.

All data stored in flip-flops 200 appears at the inputs to AND gates 208. Whenever a register is selected to transfer its information out to Output Transfer Bus 102, the Control Memory 116 sends a TRANSFER OUT TO BUS signal level to this register which enables AND gates 208 to transfer the data out.

*Operation of the arithmetic-logit unit*

Figure 5:
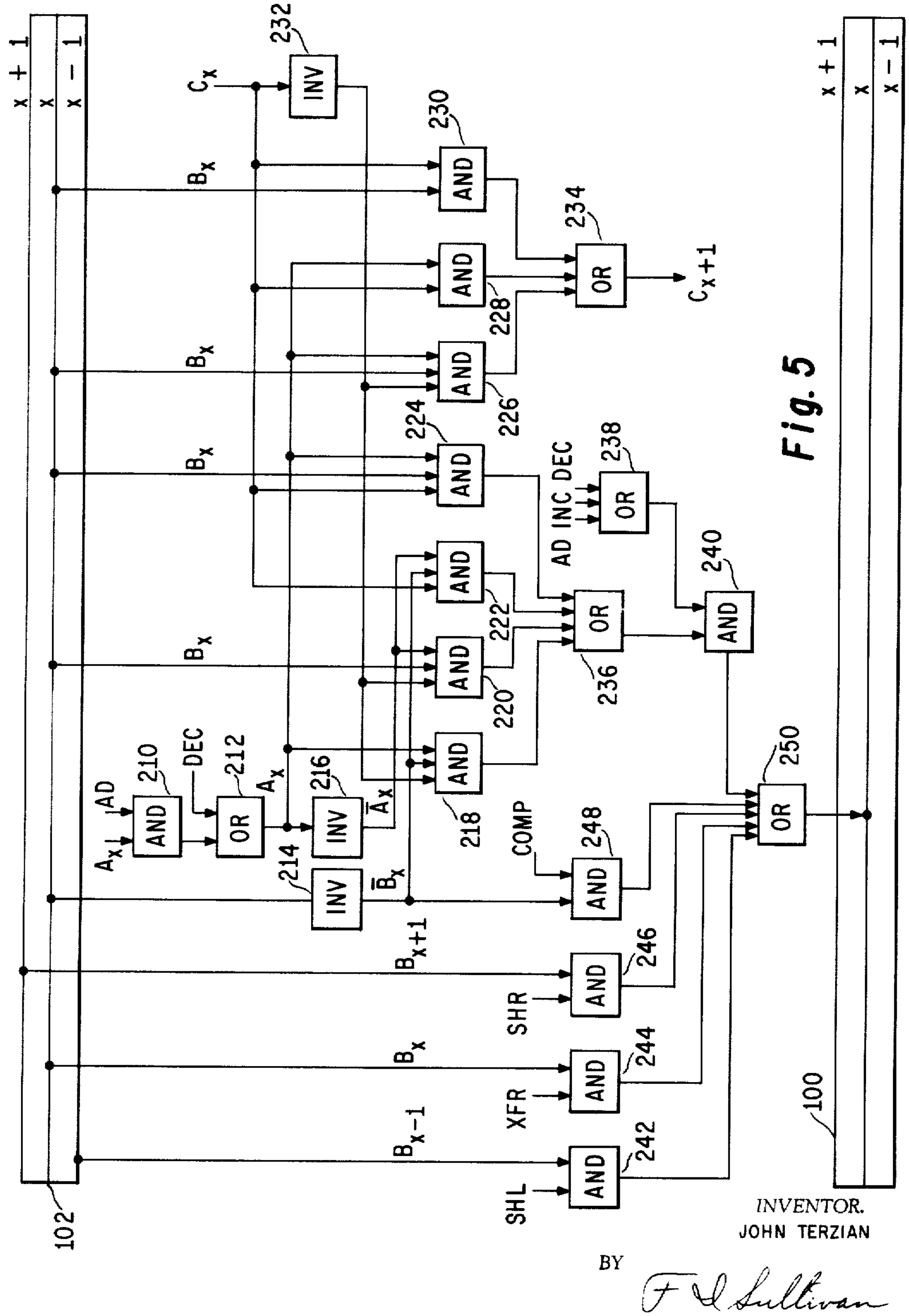

FIG. 5 shows a logic matrix for one stage of the Arithmetic-Logic Unit 158. The following logic operations are performed by this matrix: and magnitude, increment (add one), decrement (substract one), transfer, complement, shift right one place, and shift left one place. For the purpose of explanation, assume that the contents of the *x*th stage of the B Register is to undergo all operations.

(1) *Add the contents of the* x*th stage of the B Register 110 to the* x*th stage of the A Register 152.*—The contents of the *x*th stage of the A Register 152 is presented to the input of AND gate 210, which is enabled by the AD level from the Control Memory 116. Thus, the contents of the *x*th stage of A Register 152 passes through OR gate 212 and is transferred to the input of INVERTER 216, AND gate 218, AND gate 224, AND gate 226, and AND gate 228. INVERTER 216 inverts the contents of the *x*th stage of the A Register 152 and transmits its output to AND gate 220 and AND gate 222. Carry $C_x$ is received from the previous stage, $x-1$, and transferred to INVERTER 232, AND gate 222, AND gate 224, AND gate 228, and AND gate 230. The output from INVERTER 232 is conveyed to AND gate 218, AND gate 220, and AND gate 226. The contents of the *x*th stage of B Register 110 located on channel *x* of the Output Transfer Bus 102, is present as an input to AND gate 220, AND gate 224, AND gate 226, AND gate 230, and INVERTER 214. The output of INVERTER 214 is transferred to an input of AND gate 218 and AND gate 222. The outputs of AND gates 218, 220, 222, 224 are inputs to OR gate 236, which transfers a ONE to AND gates 240 if any one or more of its inputs is a ONE. The AD level from Control Memory 116 is passed through OR gate 238 to enable AND 240 to pass its addition information through to OR gate 250. This gate puts the ADD information on the *x*th channel of the Input Transfer Bus 100, which transfers it to the *x*th stage of A Register 152. The outputs of AND gates 226, 228, 230 are inputs to OR gate 234. If any input is a ONE a carry signal is transferred to the next logic stage, $x+1$.

(2) *Increment the B Register 110.*—For this operation, the A input is replaced by a ZERO in every stage and the carry input to the first stage is a ONE. Thus, if *x* were taken as the first stage, the result of $B_x$ plus 1 appears at the input to AND gate 240. The INC level is received from Control Memory 116 and passes through OR gate 238 so as to enable AND gate 240 to pass its increment information through OR gate 250 to the *x*th channel of the Input Transfer Bus 100.

(3) *Decrement the B Register 110.*—For this operation, the A input is replaced by a ONE in all stages. This is equivalent to subtracting one since the two's complement of a one is $2^n-1$ where *n* specifies the number of bits in the binary word which is being decremented. The DEC level is presented to OR gate 212, which is equivalent to placing a ONE at the A input of AND gate 210 and enabling it with the AD level. Consequently, the result of $B_x$ minus 1 appears at the output of OR gate 236 and travels to AND gate 240. The DEC level from Control Memory 116 is transferred through OR gate 238 to enable AND gate 240. This information is then transmitted through OR gate 250 to channel *x* of the Input Transfer Bus 100.

(4) *Transfer the contents of the B Register 110 to the A Register 152.*—The information on channel *x* of the Output Transfer Bus 102, which is the data stored in the *x*th stage of B Register 110, is placed at the input to AND gate 244. This is enabled by the XFR level from Control Memory 116. Thus, $B_x$ is transferred through OR gate 250 to channel *x* of the Input Transfer Bus 100 for transfer to A Register 152.

(5) *Complement the B Register 110.*—The contents of the *x*th stage of the B register 110 is taken off channel *x* of the Output Transfer Bus 102 and inverted by INVERTER 214 so that $\overline{B}_x$ is sent to AND gate 248. A COMP level is received from the Control Memory 116, which enables AND gate 248 to transmit $\overline{B}_x$ through OR gate 250 to channel *x* of the Input Transfer Bus 100.

(6) *Shift the information stored in B Register 110 one place to the right.*—This means that the contents of $B_x+1$ must now be stored in $B_x$. Therefore, the information on channel $x+1$ of the Output Transfer Bus 102 is presented at the input of AND gate 246. The SHR level from Control Memory 116 enables AND gate 246 to transfer its data through OR gate 250 to channel *x* of the Input Transfer Bus 100.

(7) *Shift the information stored in B Register 110 one place to the left.*—This means that the contents of $B_x-1$ must now be stored in $B_x$. Therefore, the information on channel $x-1$ of the Output Transfer Bus 102 is presented at the input to AND gate 242. The SHL level from Control Memory 116 enables AND gate 242 to send its data through OR gate 250 to channel *x* of the Input Transfer Bus 100.

*Wired-in control operations*

Most operations of the microprogrammed computer are executed under the control of microinstructions. However, a few which are explained below must be wired into the Control Logic Unit 144 so as to enable the basic microinstruction routines to be executed properly.

PROGRAM MEMORY CYCLE

Internal operations in the Program Memory 104 are initiated by READ and WRITE levels specified by the microinstructions. At the time a READ level is present at the memory input, a CLEAR level from the Control Logic Unit 144 is also present to clear the B Register 110 so that it is free to receive the information being read. This information is amplified by memory sense amplifiers and loaded into the B Register 110 within 2 microseconds of the start of the READ level.

Application of a WRITE level causes the contents of B Register 110 to be recorded in the internal memory location specified by the contents of the Program Memory Address Register 108. The write operation is completed within 2 microseconds of the beginning of the WRITE level. United States patent application Ser. No. 755,565, supra, may be consulted for a more detailed explanation of the manner in which reading and writing are accomplished.

BASIC CONTROL CYCLE

The Basic Control Cycle consists of the steps required to keep the computer in operation. Most operations are performed under control of the microoperations; but a few, which are listed below, are necessary to initiate the microoperations themselves. These are initiated by each timing level and are generated by the Control Logic Unit 144.

The computer is set into operation when the Halt Flip-Flop 142 is cleared and as a result the timing levels are emitted from Clock 138 and Timer 140. Thereafter, the followink cycle is repeated automatically during each timing interval:

(a) Transfer the contents of the Input Transfer Bus 100 to the register or flip-flop specified by the IN field of the Control Memory Output Register 122;

(b) Add one to the contents of the Control Memory Address Register 120. This count operation is inhibited if the microinstruction specifies that the contents of $B_{op}$ or CB are to be transferred to Control Memory Address Register 120;

(c) Clear the Control Memory Output Register 122;

(d) Send a READ level to the Control Memory 118. This causes the contents of the internal memory location specified by Control Memory Address Register 120 to be read out, amplified by the memory sense amplifiers, and loaded into the Control Memory Output Register 122. The transfer of information into this register is completed within ½ microsecond of the beginning of the READ cycle.

CONTROL WRITE-IN CYCLE

This cycle is avilable to allow the contents of Control Memory 118 to be changed and is initiated by the depression of a pushbutton switch in Control Console 146, which causes a sequence of control levels to be generated by Control Logic Unit 144. Only wired control is used because memory 118 is busy receiving new information and hence cannot also be generating microinstructions at the same time.

The locations in memory must first be emptied before new information can be stored. This is accomplished by Control Logic Unit 144 which clears the Control Memory Input-Output Register 122, and then causes the Control Memory Address Register 120 to sequentially step through each address and applies a READ level at each location until the entire memory is empty.

The tape containing the new microinstructions may now be read by means of the Paper Tape Reader 170 and placed in memory 118. The alpha-numeric code used on this tape will be explained below under the heading Program Read-in Microroutine. A control level sets the Input Device Filp-Flop 178 and causes the reader 170 to commence reading. When the first character is read, a control level causes it to be transferred into the Input Buffer Register 174 and sets the Input Device Busy Flip-Flop 182. Each word is assembled in the A Register 152 before it is transferred to Control Memory Input-Output Register 122. After each access into memory 118, a control level causes the next microinstruction to be entered into Control Memory Input-Output Register 122, steps the Control Memory Address Register 120 one place, and writes this microinstruction into memory 118. After the last word is entered into its proper memory location, Paper Tape Reader 170 is stopped and flip-flops 178, 182 are reset.

INPUT-OUTPUT CYCLE

Input-output operations are executed partially under microoperation control and partially under wired-in control from the Control Logic Unit 144. For instance, a microinstruction causes the Input Device Flip-Flop 178 to be set but wired controls turn on the Paper Tape Reader 170 when this flip-flop is set so that the reading action commences. Whenever a character is read from paper tape, wired control allows this character to be loaded into the Input Buffer Register 174 and sets the Input Device Busy Flip-Flop 182. This flip-flop is sensed during the Basic Cycle microroutine, and the incoming character is processed under control of the microinstructions of the input processing microroutine.

Outputs are processed in an analogous manner. The Output Device Flip-Flop 180 is set by a microinstruction whereas the Paper Tape Punch 172 is turned on by wired control and punches out the character stored in the Output Buffer Register 176 onto paper tape. As soon as punching is complete, wired control sets the Output Device Busy Flip-Flop 184. This is sensed by microinstruction and the resetting of the Output Device Busy Flip-Flop 184 and the Output Device Flip-Flop 180 is executed under control of the microinstructions and the output processing microroutine.

*Microroutines*

The detailed operations of the computer are performed under the control of the microroutines stored in Control Memory 118. The majority of these are for the purpose of specifying the steps to be taken in the execution of the microinstructions stored in the Program Memory 106 as part of the computer program. However, there are a number of special microroutines which are not part of the program but which are put into operation when required, either automatically or under manual command from the Control Console 146. These will now be briefly described so as to give added meaning to their coding which will be given below under the heading MICROROUTINE ORDER MECHANISM.

BASIC CYCLE MICROROUTINE

The Basic Cycle microroutine precedes each instruction microroutine and performs the follow steps;

(a) Senses the Input Device Busy Fip-flop 182 and the Output Device Busy Flip-Flop 184 to see whether any in-out processing is required. If it is, control is immediately transferred to the in-out processing routines. The in-out microroutines process a single character at a time and return control to the Basic Cycle upon completion of the processing of a single character.

(b) Fetches a microinstruction from the location in Program Memory 106 specified by the Program Counter 112.

(c) Adds one to the contents of the Program Counter 112.

(d) Senses the index indicator bit I of the macroinstruction. If no indexing is required, control is transferred directly to the instruction microroutine specified by the $B_{op}$ code of the macroinstruction. If indexing is required, the index information stored in the location specified by the $B_g$ field of the macroinstruction is fetched from Program Memory 106 and added to the alpha field of the macroinstruction before control is transferred to the appropriate instruction microroutine.

INPUT PROCESSING MICROROUTINE

Input operations are initiated by the READ microroutine which sets the Input Device Flip-Flop 178. Wired circuits in Control Logic Unit 144 turn the Paper Tape Reader 170 on, load its information into the Input Buffer Register 174, and set the Input Device Busy Flip-Flop 182. This flip-flop is sensed at the beginning of each Basic Cycle microroutine, and if it has been set, control is transferred to the input processing microroutine.

Previous to the initiation of an input operation, the main program will have loaded three control words at predesignated locations in the Program Memory 106. These words $X_1$, $X_2$, and $X_3$ specify, respectively, the number of characters to be loaded in each word, the address at which the first word is to be stored, and the total number of words to be read from paper tape. The input processing microroutine makes access to these words and stores the incoming characters into the Program Memory 106 at the prescribed locations. The contents of $X_1$, $X_2$, and $X_3$ are adjusted appropriately after each character is received. When $X_3$ has been decremented to zero, the Paper Tape Reader 170 is turned off and the operation is complete.

It should be noted that input characters are received at the Input Buffer Register 174 from the Paper Tape Reader 170 at approximately 10 millisecond intervals, between which computation continues uninterrupted in the computer.

OUTPUT PROCESSING MICROROUTINE

Output operations and the output processing microroutine are directly analogous to the input routines described above. Output operations are executed in accordance with control words $Y_1$, $Y_2$, and $Y_3$.

CLEAR COMPUTER MICROROUTINE

The Clear Computer microroutine is used to clear all registers and flip-flops in the computer while the machine is halted. If the Clear Computer switch of Control Console 146 is depressed and the computer is halted, the address of the first microinstruction of the Clear Computer microroutine is loaded into the Control Memory Address Register 120. Subsequently, the Halt Flip-Flop 142 is cleared and the computer is set into operation so that all registers and flip-flops may be cleared under the control of the Clear Computer micro-routine.

CLEAR PROGRAM MEMORY MICROROUTINE

This routine is used for clearing all registers in the Program Memory 106. It is set into operation from Control Console 146 by setting Halt Flip-Flop 142 and suppressing the Clear Program Memory switch. The microroutine then steps sequentially through all memory locations applying a READ level at each location, thereby clearing the entire memory.

PROGRAM READ-IN MICROROUTINE

The Program Read-in Microroutine is initiated by setting the Halt Flip-Flop 142 and depressing the pushbutton switch in Control Console 146 which loads the lead address of this microroutine into the Control Memory Address Register 120. An octal tape for initial program loading is then read and assembled. Subsequent binary or alpha-numeric programs can be later entered under direct program control through boot-strapping from the octal tape which is loaded by the Program Read-in microroutine. An alpha-numeric Program Read-in microroutine may be added to Control Memory 106 if desired.

It has been assumed that the tape will use an alpha-numeric code having all ZERO's in the three high-order bits of characters used to represent the numerals 0–7 and a binary coded decimal representation for the three low-order bits. An octal tape can thus be prepared directly from an alpha-numeric keyboard which can punch out six bits at a time. Other code combinations can be used; however, they would entail added processing in the Program Read-in microroutine.

The first word on the octal tape specifies the lead address in memory at which incoming programs will be stored, while the second word specifies the number of words to be read in. Upon completion of the Program Read-in process, the address of the last word read in from tape is stored in the Program Counter 112. The last word read in becomes the first instruction executed and normally is a control transfer instruction.

The first word is stored in Program Memory Address Register 108, the second in Program Counter 112, and each succeeding word in memory at the address indicated by Address Register 108. The Program Counter 112 is decremented and the Program Memory Address Register 108 incremented after each access to memory. All words are first assembled three bits at a time in A Register 152 until a total of ten characters is present since the three ZERO bits are discarded. When the Program Counter 112 reaches ZERO, reading is stopped. The contents of Program Memory Address Register 108 is transferred to Program Counter 112. Control Memory Address Register 120 is cleared and the computer is halted.

*Microprogram mechanization symbols and coding*

The microinstructions to be stored in Control Memory 118 are coded as a series of equations of the form:

$$V{:}O=I,TO$$

(1) The quantity V to the left of the colon represents a binary word specified by the variable field of Control Memory Output Register 122. If an operation is to be performed unconditionally, V is omitted from the equation.

(2) The quantity O to the immediate right of the colon represents the register or flip-flop specified by the OUT field of Control Memory Output Register 122.

(3) The symbol to the right of O represents the operation specified by the MO field of Control Memory Output Register 122. In some cases, the O symbol and the MO symbol must be interpreted together. The following list indicates the symbols for each of seven operations that can be specified by the MO field.

(a) Transfer—$\rightarrow$
(b) Complement—$O'\rightarrow$
(c) Shift Right—$O\xrightarrow{SHR}$
(d) Shift Left—$O\xrightarrow{SHL}$
(e) Increment—$(O+1)\rightarrow$
(f) Decrement—$(O-1)\rightarrow$
(g) Add—$(O+A)\rightarrow$ (4) The quantity I to the left of the comma represents the input register or flip-flop specified by the IN field of Control Memory Output Register 122.

(5) The quantity TO to the right of the comma represents the special control or tag operation specified by the tag field of Control Memory Output Register 122. This operation is executed unconditionally and does not depend on the quantity V, and is omitted if no control operation is to be performed.

ILLUSTRATIVE EQUATIONS

A few examples of this coding will now be shown and described.

(a) $A\rightarrow B$—Transfer the contents of the A Register 152 to the B Register 110.

(b) $A_{sn}{:}B\rightarrow PC$—If the $A_{sn}$ Flip-Flop 166 contains a ONE, transfer the contents of B Register 110 to Program Counter 112.

(c) $OF{:}(B+A)\rightarrow A$, READ—If the Overflow Flip-Flop 164 contains a ONE, add the contents of B Register 110 to A Register 152. In any event, apply a READ level to the Program Memory 106.

(d) $(T=0)'A\xrightarrow{SHR}B$, $CB_{004}\rightarrow CMA$—If the contents of T Register 160 is not ZERO, shift the contents of A Register 152 right one place and put the result in B Register 110. In any event, load the CB field into the Control Memory Address Register 120. It will have the binary configuration 00000100.

The actual coding for this last equation is as follows:

| V | TO | OUT | IN | MO | CB |
|---|---|---|---|---|---|
| (T=O)' | CB→CMA | A | B | SHR | 00000100 |

It is to be understood that these symbols would be expressed in the appropriate binary code.

*Microroutine order mechanism*

1. BASIC CYCLE

000 $IDB{:}CB_{122}\rightarrow CMA$
001 $ODB{:}CB_{147}\rightarrow CMA$
002 $PC\rightarrow PMA$, READ
003 $(PC+1)\rightarrow PC$, WRITE
004 $I'{:}B_{op}\rightarrow CMA$
005 $A\rightarrow Q$
006 $B\rightarrow A$
007 $B_g\rightarrow PMA$, READ
010 NO OP, WRITE
011 $B+A\rightarrow B$
012 $Q\rightarrow A$
013 $B_{op}\rightarrow CMA$

2. CLA—CLEAR AND ADD TO ACCUMULATOR

014 $B\rightarrow PMA$, READ
015 NO OP, WRITE
016 $B\rightarrow A$, $CB_{000}\rightarrow CMA$

3. CLS—CLEAR AND SUBTRACT FROM ACCUMULATOR

017 $B\rightarrow PMA$, READ
020 NO OP, WRITE
021 $B\rightarrow A$
022 $A'_{sn}\rightarrow A_{sn}$, $CB_{000}\rightarrow CMA$

4. ADD—ADD TO ACCUMULATOR

023 B→PMA, READ
024 O→OF, WRITE
025 $A_{sn}\oplus B_{sn}$:$CB_{033}$→CMA
026 B+→A
027 OF:O′→OA, $CB_{000}$→CMA

5. SUB—SUBTRACT FROM ACCUMULATOR

030 B→PMA, READ
031 O→OF, WRITE
032 $A_{sn}\oplus B_{sn}$:$CB_{026}$→CMA
033 B′→B
035 (B+A)→A
036 OF:$CB_{041}$→CMA
037 A′→A
040 (A+1)→A
041 O→CMA

6. ADM—ADD MAGNITUDE TO ACCUMULATOR

042 B→PMA, READ
043 O→OF, WRITE
044 $B^{SHL}$→B
045 B→$^{SHR}$B, $CB_{025}$→CMA

7. SBM—SUBTRACT MAGNITUDE FROM ACCUMULATOR

045 B→PMA, READ
047 O→OF, WRITE
050 B→$^{SHL}$B
051 B→$^{SHR}$B, $CB_{032}$→CMA

8. MULTIPLY

052 B→PMA, READ
053 $CB_{035}$→T, WRITE
054 $B_{sn}$:$A'_{sn}$→$A_{sn}$
055 A→Q
056 O→AOF
057 $Q_1$:(B+A)→A
060 AFO→$^{SHR}$AOF
061 Q→$^{SHR}$Q
062 (T−1)→T
063 (T=0)′:$CB_{057}$→CMA
064 O→CMA

9. STR—STORE

065 B→PMA, READ
066 A→B, WRITE
067 O→CMA

10. TRU—UNCONDITIONAL CONTROL TRANSFER

070 B→PC, $CB_{000}$→CMA

11. TROA—TRANSFER ON OVERFLOW ALARM

071 OA:B→PC, $CB_{000}$→CMA

12. TRN—TRANSFER ON NEGATIVE ACCUMULATOR

072 $A_{sn}$:B→PC, $CB_{000}$→CMA

13 TRZ—TRANSFER ON ZERO ACCUMULATOR

073 A→Q
074 O→OF
075 (O′+A)→A
076 OF:B→PC
077 Q→A, $CB_{000}$→CMA

14. TRX—TRANSFER ON ZERO INDEX

100 B→Q
101 $B_g$→PMA, READ
102 NO OP
103 ($B_{1-15}$=0):$CB_{106}$→CMA
104 (B−1)→B, WRITE
105 Q→PC
106 O→CMA

15. TRID—TRANSFER ON INPUT OPERATION

107 ID:B→PC, $CB_{000}$→CMA

16. TROD—TRANSFER ON OUTPUT OPERATION

110 OD:B→PC, $CB_{000}$→CMA

17. SR—SHIFT ACCUMULATOR RIGHT 111 ($B_{1-15}$=0):$CB_{000}$→CMA
112 A→$^{SHR}$A
113 (B−1)→B, $CB_{111}$→CMA

18. SL—SHIFT ACCUMULATOR LEFT 114 ($B_{1-15}$=0):$CB_{000}$→CMA
115 $A^{SHL}$→A
116 (B−1)→B, $CB_{114}$→CMA

19. HLT—HALT

117 O′→HLT, $CB_{000}$→CMA

20. READ

120 O′→ID, $CB_{000}$→CMA

21. WRITE

121 O′→OD, $CB_{000}$→CMA

22. INPUT PROCESSING

122 $CB_{X_1}$→PMA, READ
123 A→Q
124 (B−1)→B
125 ($B_{1-15}$=0):O→IDB
126 ($B_{1-15}$=0):$CB_{005}$→B, WRITE
127 $CB_{X_2}$→PMA, READ
130 $CB_{006}$→T
131 B→A
132 IDB′:(B+1)→B, WRITE
133 A→PMA, READ
134 (T−1)→T
135 $B\overset{SHL}{\rightarrow}B$
136 (T=0)′:$CB_{134}$→CMA
137 (A+IB)→B, WRITE
140 IDB′:$CB_{142}$→CMA
141 O=IDB, $CB_{146}$→CMA
142 $CB_{X_3}$→PMA, READ
143 NO OP
144 (B−1)→B, WRITE
145 ($B_{1-15}$=0):O→ID
146 Q→A, $CB_{000}$→CMA

23. OUTPUT PROCESSING

147 $CB_{Y_1}$→PMA, READ
150 O→OF
151 (B−1)→B
152 ($B_{1-15}$=0):1→OF
153 ($B_{1-15}$=0):$CB_{005}$→B, WRITE
154 $CB_{Y_2}$→PMA, READ
155 $CB_{006}$→T
156 B→Q
157 OF:(B+1)→B, WRITE
160 Q→PMA, READ
161 O→ODB
162 B→OB
163 $B\overset{SHR}{\rightarrow}B$
164 (T−1)→T
165 (T=0)′:$CB_{163}$→CMA
166 NO OP:WRITE
167 OF:$CB_{171}$→CMA
170 O→CMA
171 $CB_{Y_3}$→PMA, READ
172 NO OP
173 (B−1)→B, WRITE
174 ($B_{1-15}$=0):O→OD
175 O→CMA

24. CLEAR COMPUTER

176 O→PC
177 O→PMA
200 O→B
201 O→A
202 O→Q
203 O→IB
204 O→OB

205 O→IDB
206 O→ODB
207 O→T
210 O→OF
211 O→OA
212 O'→HLT, $CB_{000}$→CMA

25. CLEAR PROGRAM MEMORY

213 O'→PC
214 PC'→A
215 O→OF
216 A→PMA, READ
217 (A+1)→A
220 OF:$CB_{222}$→CMA
221 $CB_{216}$→CMA
222 O'→HLT, $CB_{000}$→CMA

26. PROGRAM READ-IN 223 1→ID
224 $CB_{010}$→B
225 $CB_{003}$→T
226 IDB:$CB_{230}$→CMA
227 $CB_{226}$→CMA
230 O→IDB

SHL

231 A→A
232 (T−1)→T
233 (T=0)':$CB_{231}$→CMA
234 (B−)→B
235 ($B_{1-15}$=0):$CB_{237}$→CMA
236 $CB_{225}$→CMA
237 OF:$CB_{243}$→CMA
240 O'→OF
241 A→PMA
242 $CB_{224}$→CMA
243 OA:$CB_{246}$→CMA
244 O'→OA
245 A→PC
246 (PC−1)→PC, READ
247 A→B, WRITE
250 (PMA+1)→PMA
251 PC→B
252 ($B_{1-15}$=0):$CB_{254}$→CMA
253 $CB_{224}$→CMA
254 O→ID
255 (PMA−1)→PC
256 O'→HLT, $CB_{000}$→CMA

ABBREVIATIONS

1. Basic Cycle
2. Clear and Add to Accumulator, CLA
3. Clear and Subtract from Accumulator, CLS
4. Add to Accumulator, ADD
5. Subtract from Accumulator, SUB
6. Add Magnitude to Accumulator, ADM
7. Subtract Magnitude from Accumulator, SBM
8. Multiply, MLY
9. Store, STR
10. Unconditional Control Transfer, TRU
11. Transfer on Overflow Alarm, TROA
12. Transfer on Negative Accumulator, TRN
13. Transfer on Zero Accumulator, TRZ
14. Transfer on Zero Index, TRX
15. Transfer on Input Operation, TRID
16. Transfer on Output Operation, TROD
17. Shift Accumulator Right, SR
18. Shift Accumulator Left, SL
19. Halt, HLT
20. Read
21. Write
22. Input Processing
23. Output Processing
24. Clear Computer
25. Clear Program Memory
26. Program Read-in

*Execution of a typical instruction*

An understanding of the structure and functional cooperation of the various units which comprise the complete system of FIG. 1 may be facilitated by a description of how the equipment performs one of its simple operations, for example, execution of the instruction: ADD THE CONTENTS OF MEMORY LOCATION *n* TO THE CONTENTS OF THE ACCUMULATOR AND LEAVE THE RESULT IN THE ACCUMULATOR. The operation will be described with reference to the timing levels of FIG. 3. The length of a complete cycle depends upon the microroutine being executed. Assume that the operand has been stored in location $n=10$, the accumulator has been loaded, and the control memory has been loaded according to the microroutine order mechanism previously set forth.

The machine is performing this instruction is concerned with three basic functions. First, the macroinstruction must be stored in the Program Memory 106; second, the macroinstruction must be extracted from the Program Memory 106 under the control of the Control Memory 118; and third, the macroinstruction must be executed under the control of the Control Memory 118.

The programmer manually sets the Halt Flip-Flop 142 to stop the computer so that he may insert his program and depresses the pushbutton switch in Control Console 146 which loads the lead address of the Program Read-in microroutine into the Control Memory Address Register 120. Reference to the MICROROUTINE ORDER MECHANISM shows this address to be #233.

The program tape contains three words: (1) the binary equivalent of seven which is one less than the address where the macroinstruction is to be stored; (2) the binary equivalent of two which is one more than the number of macroinstructions; and (3) the actual ADD macroinstruction.

PROGRAM READ-IN CYCLE

TF–1

The contents of location #223 in Control Memory 118 are read out and decoded. The Input Device Flip-Flop 178 is then set and Control Memory Address Register 120 is stepped to #224. (1→ID)

TF–2

The contents of location #224 in Control Memory 118 are read out and decoded. The binary equivalent of ten is transferred to the B Register 110 so that the number of octal groups placed in A Register 152 may be counted until a full word is stored, i.e. ten groups. The Control Memory Address Register 120 is stepped to location #225. ($CB_{010}$→B)

TF–3

The contents of location #225 in Control Memory 118 is read out and decoded. The binary equivalent of three is transferred to the T Register 160 so that the A Register 152 may be shifted three places to allow for the addition of a new octal group. The Control Memory Address Register 120 is stepped to location #266. ($CB_{003}$→T)

TF–4

The contents of location #226 in Control Memory 118 is read out and decoded. The Input Device Busy Flip-Flop 182 has been set by the transfer-in of an octal group of binary digits. Consequently, the binary equivalent of #230 is transferred to Control Memory Address Register 120. If no information had arrived in A Register 152, the Control Memory Address Register 120 would have been stepped to #227 so as to cause a looping action to see if the information had yet arrived.

(IDB:$CB_{230}$→CMA)

TF–5

The contents of location #230 in Control Memory 118 is read out and decoded. The Input Device Busy Flip-Flop 182 is reset and the Control Memory Address Register 120 is stepped to #231. (O→IDB)

TF–6

The contents of location #231 in Control Memory 118 is read out and decoded. The A Register 152 is shifted left one place and the Control Memory Address Register 120 is stepped to #232. $(A \xrightarrow{SIIL} A)$

TF–7

The contents of location #232 in Control Memory 118 is read out and decoded. The T Register 160 is decremented by one and the Control Memory Address Register 120 is stepped to #233. ([T−1]→T)

TF–8

The contents of location #233 in Control Memory 118 is read out and decoded. Since the T Register 160 contains the binary equivalent of two, the Control Memory Address Register 120 receives address #231 and a looping action commences. $([T=0]':CB_{231}\rightarrow CMA)$

TF–9—TF–11

The action occurring during TF–6—TF–8 is repeated. However, T Register 160 now contains the binary equivalent of one so that looping is again necessary. Consequently, the Control Memory Address Register 120 receives address #231.

TF–12—TF–14

The action occurring during TF–6—TF–8 is again repeated. Since the T Register 160 now is at zero, the Control Memory Address Register 120 is stepped to #234.

TF–15

The contents of location #234 in Control Memory 118 is read out and decoded. The contents of B Register 110 is decremented by one and the Control Memory Address Register 120 is stepped to #235. ([B−1]→B)

TF–16

The contents of location #235 in Control Memory 118 is read out and decoded. Since the B Register 110 contains the binary equivalent of nine, the Control Memory Address Register 120 is stepped to #236. $([B_{1-15}=0]:CB_{237}\rightarrow CMA)$

TF–17

The contents of location #236 in Control Memory 118 is read out and decoded. The Control Memory Address Register 120 receives address #225 so that a looping action will commence. $(CB_{225}\rightarrow CMA)$

TF–18—TF–33

The action occurring during TF–3—TF–17 is repeated. Since the B Register 110 contains the binary equivalent of eight, the Control Memory Address Register 120 receives address #225 so that the preceding looping action again repeats.

TF–34—TF–49

The action occurring during TF–3—TF–17 is again repeated. Since the B Register 110 contains the binary equivalent of seven, address #225 is transferred to the Control Memory Address Register 120 and the preceding looping action is repeated.

TF–50—TF–65

The action during TF–3—TF–17 is repeated. B Register 110 now contains the binary equivalent of six and Control Memory Address Register 120 again receives address #225 and the looping action repeats.

TF–66—TF–61

The action during TF–3—TF–17 is repeated. The binary equivalent of five is now stored in B Register 110 so that address #225 is sent to the Control Memory Address Register 120 and the preceding looping action repeats.

TF–82—TF–97

The action occurring during TF–3—TF–17 is again repeated. Since the B Register 110 now contains the binary equivalent of four, the Control Memory Address Register 120 receives address #225 and looping repeats.

TF–98—TF–113

The action during TF–3—TF–17 is repeated. B Register 110 contains the binary equivalent of three and Control Memory Address Register 120 stores address #225 for looping again.

TF–114—TF–129

The action of TF–3—TF–17 is again repeated. Since B Register 110 now stores the binary equivalent of two, Control Memory Address Register 120 receives address #225 and looping repeats.

TF–130—TF–145

The action of TF–3—TF–17 is repeated. B Register 110 contains the binary equivalent of one and the Control Memory Address Register 120 contains address #225 for looping one more time.

TF–146—TF–160

The action of TF–3—TF–16 is repeated. However, the Control Memory Address Register 120 receives address #237 because B Register 110 is now at zero. $([B_{1-15}=0]:CB_{237}\rightarrow CMA)$

TF–161

The contents of location #237 in Control Memory 118 is read out and decoded. Since only word 1 has been stored in A Register 152, the Overflow Flip-Flop 164 has not been set. Therefore, the Control Memory Address Register 120 is stepped to location #240. $(OF:CB_{243}\rightarrow CMA)$

TF–162

The contents of location #240 in Control Memory 118 is read out and decoded. Overflow Flip-Flop 164 is set and the Control Memory Address Register 120 is stepped to #241. (O′→OF)

TF–163

The contents of address #241 in Control Memory 118 is read out and decoded. Word 1 is transferred to the Program Memory Address Register 108 and the Control Memory Address Register 120 is stepped to address #242 (A→PMA)

TF–164

The contents of location #242 in Control Memory 118 is read out and decoded. Address #224 is transferred to Control Memory Address Register 120 so that word 2 may be processed. $(CB_{224}\rightarrow CMA)$

TF–165—TF–325

The action which occurred during TF–2—TF–161 is repeated for word 2; however, Control Memory Address Register 120 now receives address #243 because the Overflow Flip-Flop 164 has been set. $(OF:CB_{243}\rightarrow CMA)$

TF–326

The contents of address #243 in Control Memory 118 is read out and decoded. Since the Overflow Alarm Flip-Flop 162 is not in its set condition, the Control Memory Address Register 120 is stepped to address #244. $(OA:CB_{246}\rightarrow CMA)$

TF–327

The contents of location #244 in Control Memory 118 is read out and decoded. Overflow Alarm Flip-Flop 162 is set and the Control Memory Address Register 120 is stepped to address #245. (O′→OA)

TF–328

The contents of address #245 in Control Memory 118 is read out and decoded. Word 2 is transferred to Program Counter 112 and the Control Memory Address Register 120 is stepped to location #246. (A→PC)

TF–329

The contents of location #246 in Control Memory 118 is read out and decoded. Program Counter 112 is decremented by one and the address specified by word 1 is read. Control Memory Address Register 120 is stepped to address #247. ([PC—1]→PC, READ)

TF–330

The contents of address #247 in Control Memory 118 is read out and decoded. The information in the A Register 152, which at this time is zero, is transferred to B Register 110 and written into Program Memory 106. The Control Memory Address Register 120 is stepped to address #250. (A→B, WRITE)

TF–331

The contents of location #250 in Control Memory 118 is read out and decoded. The Program Memory Address Register 108 is incremented by one and the Control Memory Address Register 120 is stepped to location #251. ([PMA+1]→PMA)

TF–332

The contents of address #251 in Control Memory 118 is read out and decoded. The information in Program Counter 112 is transferred to the B Register 110 and the Control Memory Address Register 120 is stepped to address #252. (PC→B)

TF–333

The contents of location #252 in Control Memory 118 is read out and decoded. Since B Register 110 contains the binary equivalent of one, the Control Memory Address Register 120 is stepped to address #253. $([B_{1-15}=0]:CB_{254}\rightarrow CMA)$

TF–334

The contents of address #253 in Control Memory 118 is read out and decoded. The Control Memory Address Register 120 receives address #224 so that a looping action will commence in order to store word 3. $(CB_{224}\rightarrow CMA)$

TF–335—TF–493

The action during TF–2—TF–161 is repeated. However, since the Overflow Flip-Flop 164 has previously been set, address #243 is loaded into Control Memory Address Register 120. $(OF:CB_{243}\rightarrow CMA)$

TF–494

The contents of location #243 in Control Memory 118 is read out and decoded. Address #246 is transferred to Control Memory Address Register 120 because the Overflow Alarm Flip-Flop 162 has previously been set. $(OA:CB_{246}\rightarrow CMA)$

TF–495

The contents of address #246 in Control Memory 118 is read out and decoded. The Program Counter 112 is decremented by one and the address specified by the Program Memory Address Register 108 is read. The Control Memory Address Register 120 is stepped to location #247. ([PC–1]→PC, READ)

TF–496

The contents of location #247 in Control Memory 118 is read out and decoded. Word 3 is transferred to the B Register 110 and written into the address specified by the Program Memory Address Register 108. The Control Memory Address Register 120 is stepped to location #250. (A→B, WRITE)

TF–497

The contents of address #250 in Control Memory 118 is read out and decoded. The Program Memory Address Register 108 is incremented by one and the Control Memory Address Register 120 is stepped to address #251. ([PMA+1]→PMA)

TF–498

The contents of location #251 in Control Memory 118 is read out and decoded. The information in Program Counter 112 is transferred to B Register 110 and the Control Memory Address Register 120 is stepped to #252. (PC→B)

TF–499

The contents of address #252 in Control Memory 118 is read out and decoded. Since the B Register 110 now contains zero information, address #254 is transferred to Control Memory Address Register 120.

$$([B_{1-15}=0]:CB_{254}\rightarrow CMA)$$

TF–500

The contents of location #254 in Control Memory 118 is read out and decoded. The Input Device Flip-Flop 178 is reset and Control Memory Address Register 120 is stepped to address #255. (0→ID)

TF–501

The contents of address #255 in Control Memory 118 is read out and decoded. The Program Memory Address Register 108 is decremented by one so that it specifies the address of word 3 and is transferred to Program Counter 112. The Control Memory Address Register 120 is stepped to address #256. ([PMA—1]→PC)

TF–502

The contents of address +56 in Control Memory 118 is read out and decoded. The Halt Flip-Flop 142 and address #0 is transferred to the Control Memory Address Register 120. $(O'\rightarrow HLT, CB_{000}\rightarrow CMA)$ The ADD macroinstruction has now been stored in location #8 in Program Memory 106 and is in the following form:

| $B_{op}$ | I | $B_g$ | $\alpha$ |
|---|---|---|---|
| 00010111 | 0 | 000000 | 000000000001010 |
| 23-30 | 22 | 16-21 | 1-15 |

The alpha field ($\alpha$) contains the binary equivalent of ten, i.e. *n*, which is the location of the operand. Since no indexing is required, there is no information in either the $B_g$ field or the I field. The $B_{op}$ field specifies address #23 which is the location in Control Memory 118 of the first macroinstruction in the ADD microroutine.

BASIC CYCLE MICROROUTINE

As has been previously mentioned, the Basic Cycle microroutine precedes each instruction microroutine. Therefore, it must operate before the ADD microroutine.

TF–1

The contents of location #0 in Control Memory 118 is read out and decoded. Since there is no information in the Input Buffer Register 174, the Control Memory Address Register 120 steps to address #1.

$$(IDB:CB_{122}\rightarrow CMA)$$

TF–2

The contents of address #1 in Control Memory 118 is read out and decoded. Since there is no information in the Output Buffer Register 176, the Control Memory Address Register 120 steps to address #2.

$$(ODB:CB_{147}\rightarrow CMA)$$

TF–3

The contents of location #2 in Control Memory 118 is read out and decoded. Address #8, the address of the macroinstruction in the Program Memory 106 is transferred to the Program Memory Address Register 108. The macroinstruction is read out and the Control Memory Address Register 120 is stepped to Location #3.

(PC→PMA, READ)

TF–4

The contents of address #3 in Control Memory 118 is read out and decoded. The Program Counter 112 is incremented by one and the macroinstruction is written back into Program Memory 106. The Control Memory Address Register 120 is stepped to address #4.

([PC+1]→PC, WRITE)

TF–5

The contents of location #4 in Control Memory 118 is read out and decoded. Since no indexing is necessary, the $B_{op}$ field of the macroinstruction, i.e. the location of the first ADD instruction, is transferred to the Control Memory Address Register 120. ($I':B_{op}\rightarrow CMA$)

ADD MICROROUTINE

TF–1

The contents of address #23 in Control Memory 118 is read out and decoded. The alpha field of the macroinstruction is transferred to the Program Memory Address Register 108 and the specified location reads out the operand which is placed in the B Register 110. The control Memory Address Register 120 is stepped to location #24. (B→PMA, READ)

TF–2

The contents of address #24 in Control Memory 118 is read out and decoded. The Overflow Flip-Fop 164 is reset and the operand rewritten into Program Memory 106. The Control Memory Address Register 120 is stepped to location #25. (O→OF, WRITE)

TF–3

The contents of location #25 in Control Memory 118 is read out and decoded. Since the sign of neither the operand nor the contents of A Register 152 is negative, the Control Memory Address Register 120 is stepped to address #26. If, however, either sign had been negative, then addition would be equivalent to subtraction and the Control Memory Address Register 120 would receive address #33 causing a transfer over to the SUBTRACT microroutine. ($A_{sn}+B_{sn}:CB_{033}\rightarrow CMA$)

TF–4

The contents of address #26 in Control Memory 118 is read out and decoded. The operand, contained in the B Register 110, is now added to the contents of A Register 152 and the result is placed in the A Register 152. This addition is performed in the Arithmetic Logic Unit 158 in the manner described for the explanation of FIG. 5. The Control Memory Address Register 120 is stepped to address #27. (B+A=A)

TF–5

The contents of location #27 in Control Memory 118 is read out and decoded. If overflow results from the addition, the Overflow Alarm Flip-Flop 162 is set. Address #0 is transferred to the Control Memory Address Register 120. ($OF:O'=OA$, $CB_{000}=CMA$)

The invention has been described as incorporated into a specific computer system. It is to be understood, however, that it is not limited to the particular computer or class of equipment described in this illustrative embodiment and may be incorporated into other types of electronic data processing system. It is realized, for instance, that for some special purpose applications the random access control memory can be replaced with a serial device such as a magnetic drum, magnetic tape, paper tape, etc.

Also, there are many techniques in addition to the one described for entering data into Control Memory 118. For example, a permanently wired program memory could be used in which a ZERO is represented by the absence of a core. With this type of memory, permanently fabricated plug-in units can be interchanged to convert from one program operation to another.

When full on-line access is desired, auxiliary control circuits can easily be provided to allow a transfer of data between Program Memory 106 and Control Memory 118. These transfer controls may themselves be controlled by a special control flip-flop whose set condition causes the normal cycle to be interrupted so that a block of information can be transferred between the two memories in accordance with data previously loaded into preassigned registers specifying the number of words to be moved, the memory locations involved, etc.

Although the illustrative embodiment of the invention described herein is a high-speed, automatic system, a manual system could be used. In such a system, the various steps of data transfer and operation may be carried out by the manual manipulation of patch cords or the depression of toggle switches in a console.

Thus, the invention is not limited to the particular illustrative examples shown and described but encompasses the full scope of the following claims.

What is claimed is:

1. For the processing of data in the form of discrete electrical signals corresponding to the component bits of a data word the combination of: a first data transfer bus having a plurality of individual conductors corresponding to the individual bits of said data word; a second data transfer bus having a plurality of individual conductors corresponding to the individual bits of said data word; a data word storage subsystem having at least one data buffer register comprising a plurality of individual signal stages which correspond to the individual component bits of said data word and are individually connected in direct data transfer relationship to corresponding individual ones of said first bus conductors and said second bus conductors; means for parallel transfer of data between said individual stages and said corresponding individual conductors of said first and second buses; an arithmetic subsystem having at least one data processing register comprising a plurality of individual signal stages which correspond to the individual component bits of said data word and are individually connected in direct data transfer relationship to corresponding individual ones of said first and second bus conductors, and an arithmetic logic unit comprising a plurality of stages of logic circuits each connected in direct data transfer relationship to corresponding individual ones of said first and second bus conductors; means for parallel transfer of data between said individual stages of said arithmetic register and said corresponding individual conductors of said first and second buses; means for parallel transfer of data between said individual stages of said arithmetic logic unit and said corresponding individual conductors of said first and second buses; a data input-output subsystem having at least one data buffer register comprising a plurality of individual signal stages which correspond to the individual component bits of said data word and are individually connected in direct data transfer relationship to corresponding individual ones of said first and second bus conductors; and, means for parallel transfer of data between said individual stages of said input-output register and said corresponding individual conductors of said first and second buses.

2. The invention according to claim 1, wherein each of said arithmetic logic unit stages comprises: a plurality of groups of separate binary logic circuits each arranged for performing a different logic function.

3. An electronic data processing system comprising: a first data transfer bus having a plurality of individual component conductors each corresponding to a separte component digit of a data word; a second data transfer bus having a plurality of individual component conductors each corresponding to a separate component digit of a data word; a memory system having a data buffer register with a plurality of component states each connected in direct data transfer relationship to one of said individual conductors of said first and second buses; an input-output system having at least one data buffer register with a plurality of component stages each connected in direct data transfer relationship to one of said individual conductors in said first and second buses; an arithmetic subsystem having at least one data buffer register with a plurality of component stages each connected in direct data transfer relationship to one of said individual conductors in said first and second buses and an arithmetic logic unit having a plurality of component stages each connected in direct data transfer relationship to one of said individual conductors in said first and second buses; each of said arithmetic logic unit stages having a plurality of groups of binary logic circuits each corresponding to a different logic function; a control subsystem arranged to control the flow of data signals between said stages and said conductors; and, a source of system-synchronizing timing levels connected to said control subsystem to synchronize said transfer of data.

4. A microprogrammed computer comprising: a first data transfer bus having a plurality of individual component conductors each corresponding to a separate component digit of a data word, a second data transfer bus having a plurality of individual component conductors each corresponding to a separate component digit of a data word; a program memory system having a data buffer register with a plurality of component stages each connected in direct data transfer relationship to one of said individual conductors of said first and second buses; an input-output system having at least one data buffer register with a plurality of component stages each connected in direct data transfer relationship to one of said individual conductors in said first and second buses; an arithmetic subsystem having at least one data buffer register with a plurality of component stages each connected in direct data transfer relationship to one of said individual conductors in said first and second buses; a microprogram storage unit arranged to control the flow of data signals between said stages and said conductors; and, a source of system-synchronizing timing levels connected to said microprogram storage unit to synchronize said transfer of data.

5. The invention according to claim 4 and wherein: said microprogram storage unit comprises a microprogram memory unit.

6. A microprogrammed computer comprising: a first data transfer bus having a plurality of individual component conductors each corresponding to a separate component digit of a data word; a second data transfer bus having a plurality of individual component conductors each corresponding to a separate component digit of a data word; a program memory system having a data buffer register with a plurality of component stages each connected in direct data transfer relationship to one of said individual conductors of said first and second buses; an input-output system having at least one data buffer register with a plurality of component stages each connected in direct data transfer relationship to one of said individual conductors in said first and second buses; an arithmetic subsystem having at least one data register with a plurality of component stages each connected in direct data transfer relationship to one of said individual conductors in said first and second buses and an arithmetic logic unit having a plurality of component stages each connected in direct data transfer relationship to one of said individual conductors in said first and second buses; each of said arithmetic logic unit stages having a plurality of groups of binary logic circuits each corresponding to a different logic function; a microprogrammed memory unit arranged to control the flow of data signals between said stages and said conductors; and a source of system-synchronizing timing levels connected to said microprogram memory unit to synchronize said transfer of data.

7. Electronic data processing apparatus of the type which operates in accordance with a program of successive instructions represented by binary coded instruction words each having an address portion and an instruction portion, to process binary coded operand words and comprising: a first data transfer bus having a plurality of individual conductors corresponding to the component bits of said binary coded words; a second data transfer bus having a plurality of individual conductors corresponding to the component bits of said binary coded words; a program memory system having a plurality of independently addressable binary data storage locations and at least one data buffer register selectively connectable to desired ones of said locations and having a plurality of individual stages each corresponding to a component bit of a data word and each having a direct data transfer connection to a corresponding conductor of said first and second buses; an arithmetic subsystem having at least two multi-stage data processing registers each having a plurality of individual stages corresponding to a component bit of a data word and each having a direct data transfer connection to a corresponding conductor of said first and second data buses and an arithmetic logic unit having multi-stage logic circuits each having a plurality of groups of logic circuits each representing a different logic function and each stage corresponding to a component bit of a data word and having a direct data transfer connection to a corresponding conductor of said first and second data buses; a timing subsystem including means for generating a cyclic sequence of timing pulses and for conducting said pulses to said various data transfer connections; and a microprogram memory system having a plurality of independently addressable binary microinstruction storage locations and being arranged to cycle through a selected plurality of said storage locations for each program instruction and having at least one data buffer register selectively connectable to desired ones of said microinstruction locations and having a plurality of individual stages each corresponding to a component bit of a microinstruction and having a direct data transfer connection to a corresponding conductor of said first and second buses and a microinstruction decoder having a direct data transfer connection from said microinstruction register and to all or said data bufler registers and arranged to decode the contents of said plurality of storage locations for each program instruction and, in conjunction with said timing system, to effect the transfer of the contents of the program memory location indicated by the address portion of said program instruction contained in said one program register as an operand word via said buffer register and said first transfer bus to said arithmetic logic unit, to logically operate upon said operand in accordance with said program instruction, and to transfer said operand to one of said data registers of said arithmetic unit.

8. A microprogrammed computer arranged to process data in the form of a multi-bit binary coded word and comprising the following combination of component systems: a first transfer bus having a plurality of separate conductors, one corresponding to each bit of said word; a second transfer bus having a plurality of separate conductors, one corresponding to each bit of said word; a program memory system including at least one multi-address memory unit; memory address and memory in-out registers connecting said memory unit to said first and second buses; a program counter register connected directly to said first and second buses, an arithmetic system connected directly to said first and second buses; a microprogrammed storage system including a multi-address control memory unit; control memory address and control memory in-out registers connecting said control memory unit to said first and second buses; and a control memory decoder having input connections from said control memory in-out register and output connections independent of said first and second transfer buses to all of said component systems; and a timing system including a basic clock and a timer circuit connected to said clock and providing a series of timing levels to all of said component systems.

9. A microprogrammed computer arranged to process data in the form of a multi-bit binary coded word and comprising the following combination of component systems: a first transfer bus having a plurality of separate conductors, one corresponding to each bit of said word; a second transfer bus having a plurality of separate conductors, one corresponding to each bit of said word; a program memory system including at least one multi-address memory unit; memory address and memory in-out registers connecting said memory unit to said first and second buses; a program counter register connected directly to said first and second buses; an arithmetic system including at least one accumulator register connected directly to said first and second buses and an arithmetic logic unit connected directly to said first and second buses, said arithmetic logic unit comprising a plurality of stages each comprising a plurality of groups of different binary logic circuits and each arranged for performing a different logic function; a microprogrammed storage system connected to said first and second buses and having output connections independent of said first and second transfer buses to all of said component systems; and a timing system including a basic clock and a timer circuit connected to said clock and providing a series of timing levels to all of said component systems.

10. A microprogrammed computer arranged to process data in the form of a multi-bit binary coded word and comprising the following combination of component systems: a first and a second transfer bus; a program memory system including at least one multi-address memory unit; memory address and memory in-out registers connecting said memory unit to said first and second buses; a program counter register connected directly to said first and second buses; a central arithmetic logic system including a plurality of individual logic circuits each directly connected to said first and second buses and each accomplishing a single logic function; a microprogrammed storage system connected directly to said first and second buses and having output connections independent of said first and second buses to all of said component systems and operative to sequentially energize selected one of said logic circuits thereby to perform a series of logic functions; and a timing system including a basic clock and a timer circuit connected to said clock and providing a series of timing levels to all of said component systems.

11. A microprogrammed computer comprising: a first memory system arranged to hold at least one operational program for said computer in the form of a series of binary instruction words; a second memory system arranged to hold a plurality of microprograms, each comprising a sequence of binary coded microinstructions, each of said microprograms corresponding to and activated in response to a different one of said binary instruction words contained within said first memory system; an input system arranged to transfer binary data into said first and second memory systems; an arithmetic system arranged to perform computation upon binary coded data in accordance with said microinstructions; means for transferring a binary instruction word from said first memory system to said second memory system; and, means for transferring a microinstruction from said second memory system to said arithmetic system, whereby said control system is operative in response to instruction from said program memory to sequentially activate units within said arithmetic system to thereby perform a sequence of logical operations in accordance with said instruction.

12. A logical switching system comprising: first and second transfer buses; a plurality of storage registers, each directly connected to said first and second transfer buses; an arithmetic logic unit connected between said first and second transfer buses, said arithmetic logic unit including a plurality of groups of different binary logic circuits, each of said groups of binary logic circuits arranged to perform a different logic function; a source of binary data; means for transferring said binary data to said first and second transfer buses; means for selectively applying binary data on said transfer buses to a selected one of said storage registers; and, means for selectively applying binary data on said transfer buses to a selected one of said groups of binary logic circuits within said arithmetic logic unit.

13. A logical switching system which comprises; a plurality of storage registers arranged to store binary data words; an arithmetic logic unit comprising a plurality of stages, each including a group of binary logic circuits and each arranged to perform a different logic function, each of said group of binary logic circuits being activated in response to a specified binary coded word; means for transferring binary data between said storage registers and said arithmetic logic unit; and means for selectively applying a binary coded data word to a selected group of binary logic circuits within said arithmetic logic unit to thereby activate said selected group of binary logic circuits to perform the desired logical function.

References Cited by the Examiner

UNITED STATES PATENTS

| | | | |
|---|---|---|---|
| 2,901,166 | 8/59 | Hamilton | 235—159 |
| 2,936,116 | 5/60 | Adamson et al. | 235—173 X |

MALCOLM A. MORRISON, *Primary Examiner.*

Notice of Adverse Decision in Interference

In Interference No. 96,524 involving Patent No. 3,215,987, J. Terzian, ELECTRONIC DATA PROCESSING, final judgment adverse to the patentee was rendered Oct. 7, 1969, as to claims 12 and 13.

[*Official Gazette November 25, 1969.*]

Disclaimer 3,215,987.—*John Terzian*, Winchester, Mass. ELECTRONIC DATA PROCESSING. Patent dated Nov. 2, 1965. Disclaimer filed Nov. 3, 1969, by the assignee, *Sylvania Electric Products Inc.*

Hereby enters this disclaimer to claims 12 and 13 of said patent.

[*Official Gazette February 10, 1970.*]